June 28, 1966
J. C. PIÉCHON
3,258,670
PROCESS AND ARRANGEMENT FOR DETERMINING THE
DISCHARGE STATE OF A BATTERY AND FOR
CHARGING AND DISCHARGING THE SAME
Filed Aug. 1, 1962
6 Sheets-Sheet 1
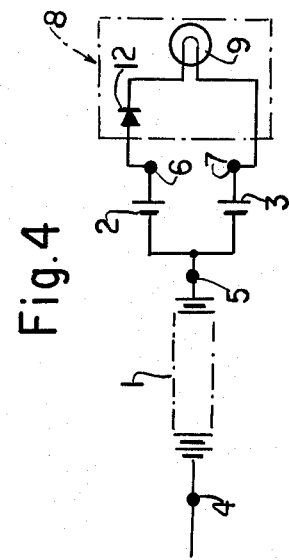
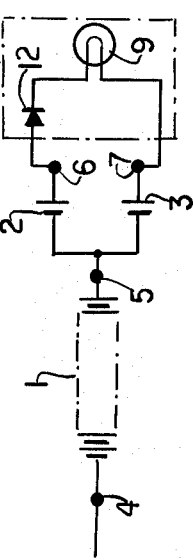
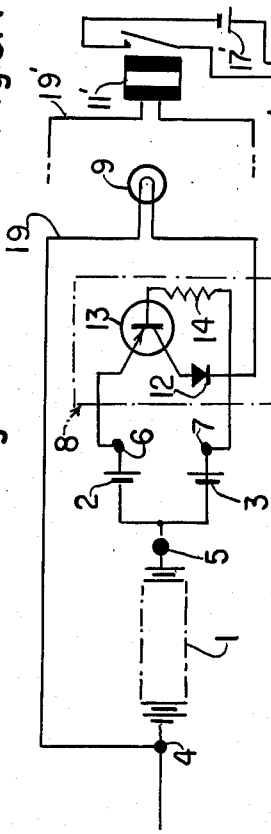
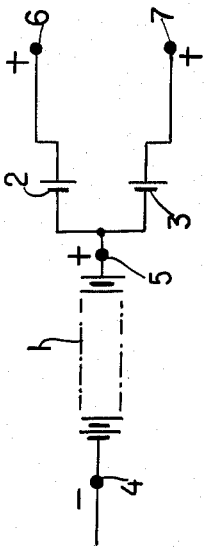
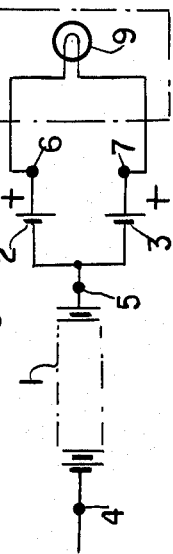
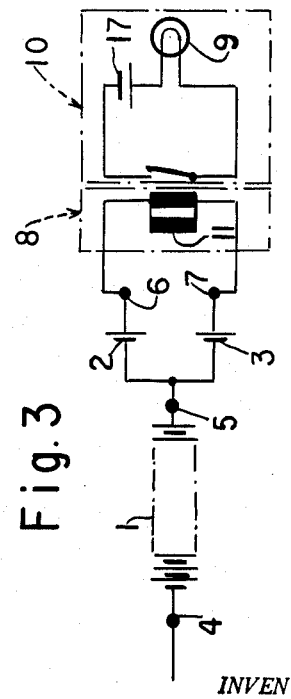
INVENTOR.
JEAN CLAUDE PIÉCHON
BY
Kenyon Kenyon
ATTORNEYS

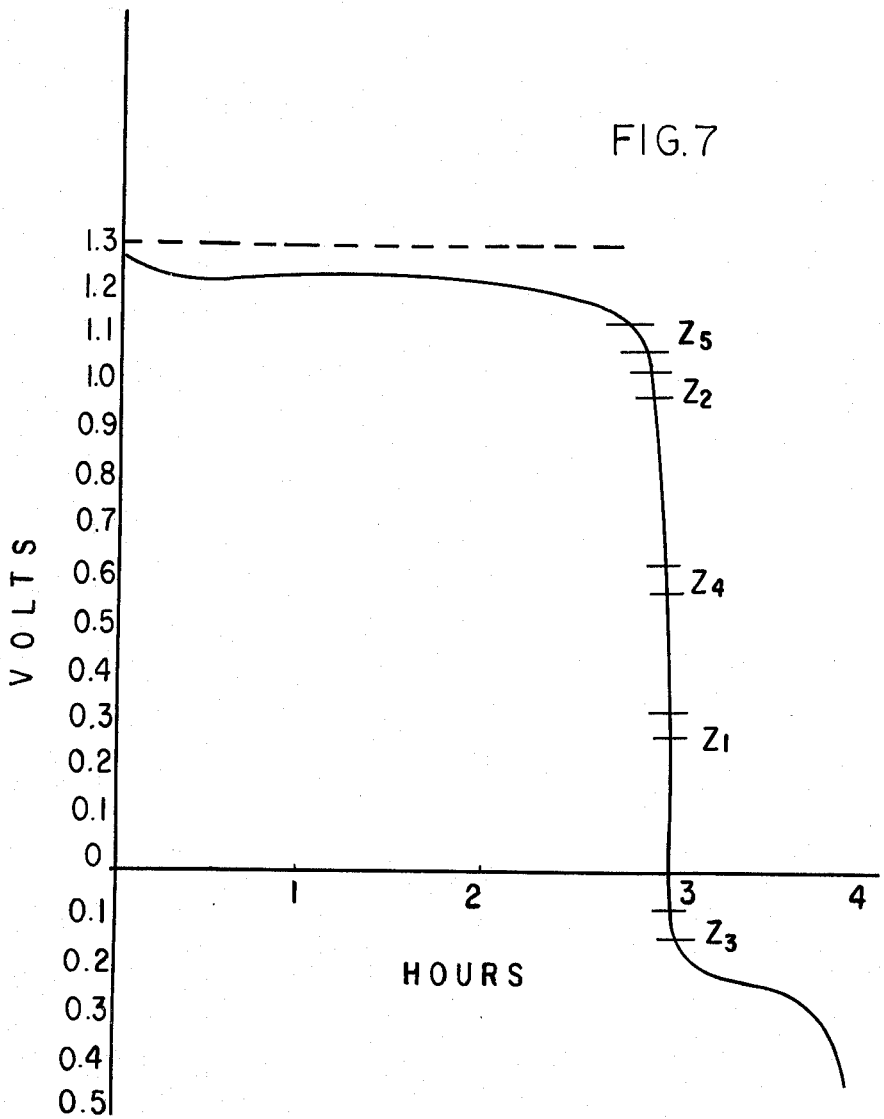
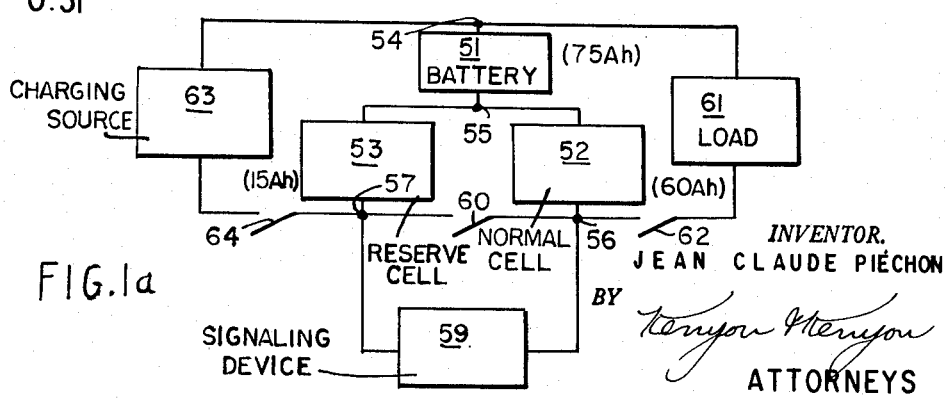

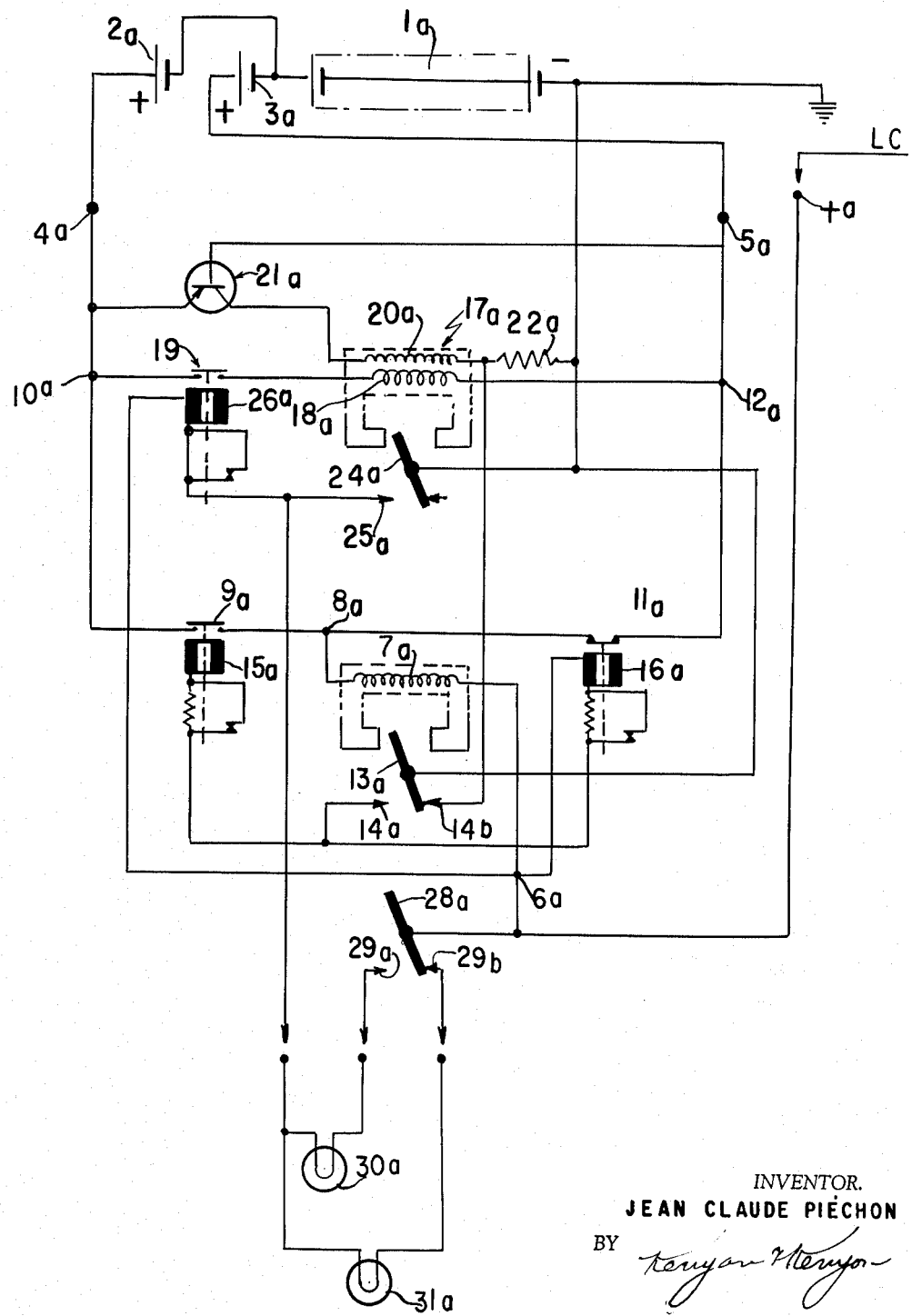

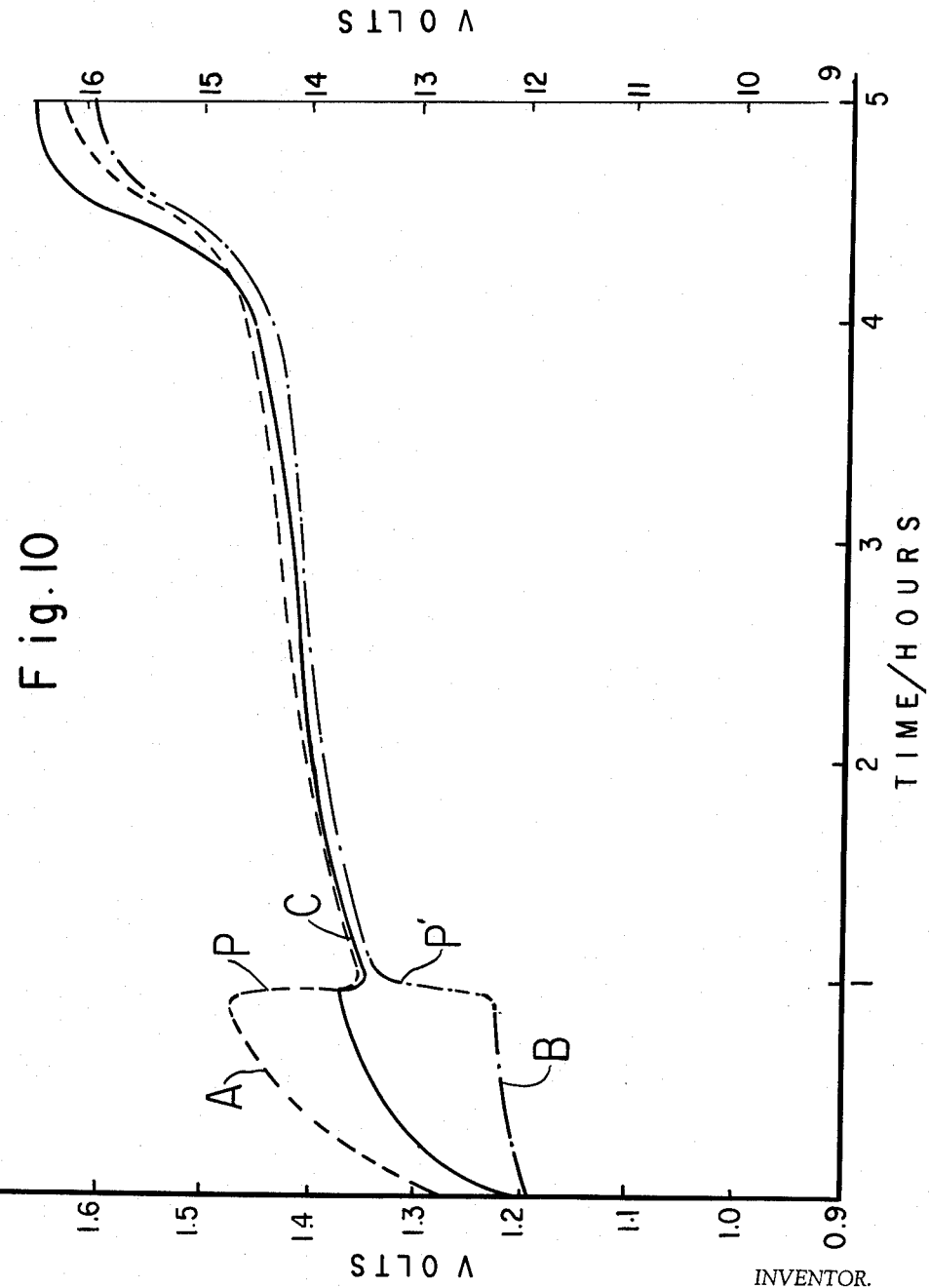

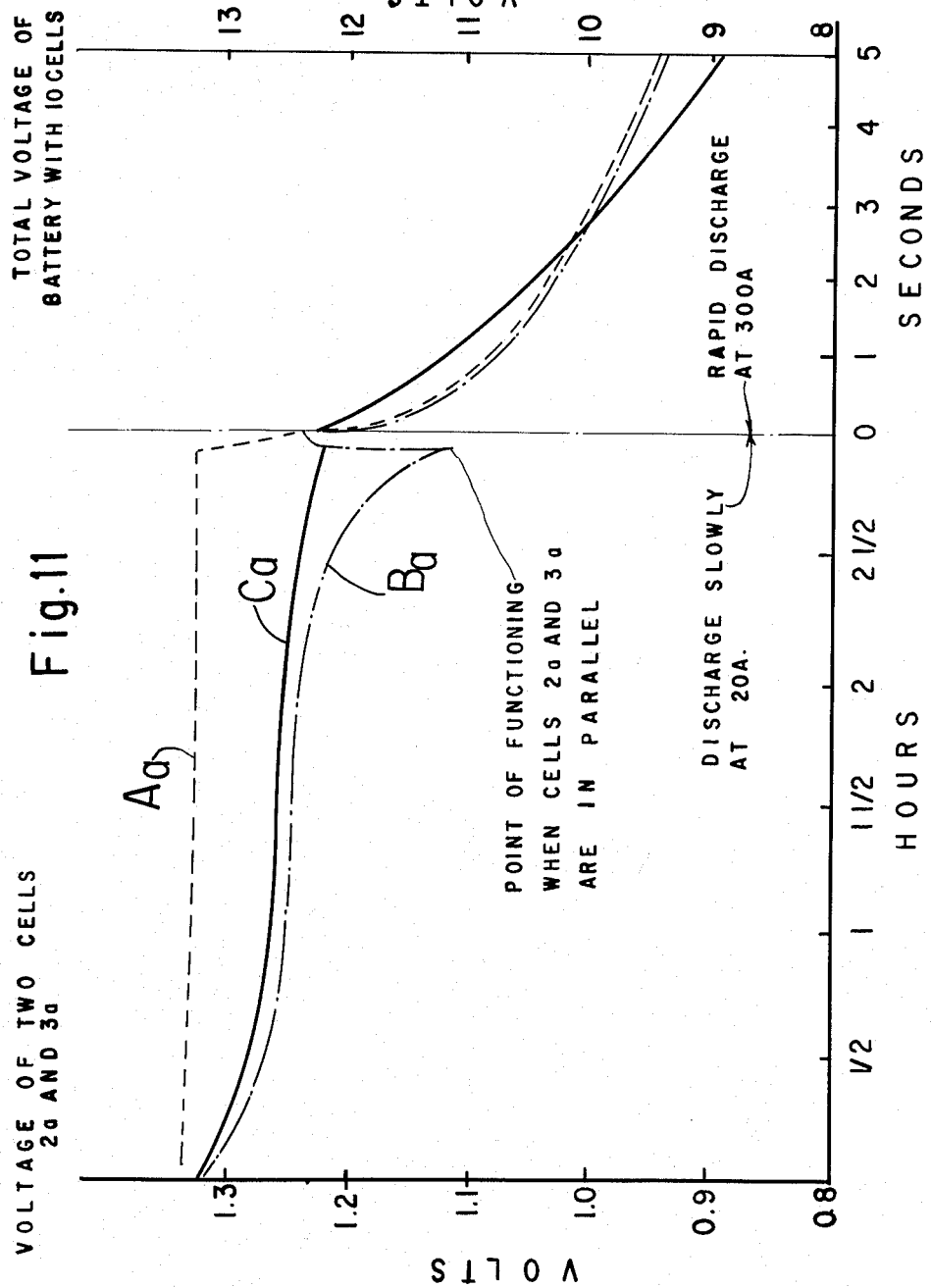

3,258,670
PROCESS AND ARRANGEMENT FOR DETERMINING THE DISCHARGE STATE OF A BATTERY AND FOR CHARGING AND DISCHARGING THE SAME

Jean Claude Piéchon, Chatillon-sous-Bagneux, France, assignor to Société des Accumulateurs Fixes et de Traction (Societe Anonyme), Romainville, France, a company of France Filed Aug. 1, 1962, Ser. No. 213,913
Claims priority, application France, Dec. 12, 1961, 881,757; Mar. 3, 1962, 889,905
24 Claims. (Cl. 320—6)

This invention relates to a process and arrangement for determining the discharge state of a battery and for charging and discharging such battery by the use of pilot cells.

It is known at the present time that in order to estimate the discharge state of a storage battery and more especially cadmium-nickel batteries with thin sintered plates, the terminal voltage is measured, said voltage being compared to that of the battery when it is fully charged. However, the terminal voltage variation only becomes substantial when the battery is completely discharged so that the warning thus obtained is hardly utilizable.

In the case of lead-acid batteries, the state of discharge may be ascertained for instance by measuring the density of the electrolyte, but in this operation is rather difficult and anyway is possible only when the battery is easily accessible. Moreover, the precision of this method is rather limited.

To sum up, the discharge state of a battery only can be ascertained rather indefinitely with the presently known means, whereas in some cases it is absolutely necessary to know at which moment the battery has reached a given discharge ratio, such as in the case of battle vehicles, of electric trucks used in plants and in other cases where battery state of charge is important.

An object of the process and apparatus of the invention is essentially to avoid these drawbacks.

The practice of the invention embraces notably the idea of grouping a number $n$ of the cells of a battery; connecting in series $n_1$ cells of the group having a capacity C; in dividing the remaining $2n_2$ cells ($2n_2=n-n_1$) into two groups of $n_2$ cells having capacities of $(1-x)C$ and $xC$ respectively ($x$ being any number comprised between 0 and 1), each being series connected with the aforesaid $n_1$ cells; and operating the battery by using the said $n_1$ cells and at least one of the said $n_2$ groups in series therewith, i.e. by using $n_1+n_2$ series-connected cells and in measuring or determining during battery operation the difference in voltage existing between the said $n_2$ group during discharge.

As may be seen, such a battery as compared to a usual one has the peculiarity of being composed of a number $n_1$ of standard cells to which are added two units of additional cells $2n_2$, only one of which is used during the normal opertaion of the battery, the other one being in a way used as a reserve cell.

According to the invention, one cell of a battery can be used as an additional cell, said cell being divided into a two part cell and being, for instance, the end cell of the battery.

Still according to the invention, $x$ is given a value corresponding to a given discharge ratio which is the discharge ratio to be determined. Thus, for instance, if a signal warning must be given when the battery is 80% discharged, $x$ is chosen as .2.

It is also possible, if it should be necessary to determine several successive states of discharge, to provide for the use of several couples of part-cells $(1-x)$ and $xC$ having different values for $x$.

According to another characteristic of the invention, the difference of the voltage between their free terminals is preferably used to measure or determine the difference in the discharges of the two said groups of cells.

Another object of the invention is the provision of a device for determining the discharge state of a storage battery, more especially remarkable in that it comprises two auxiliary units constituted by two cells or groups of cells both connected to one of the terminals of several series-connected cells having a capacity C, said auxiliary units having capacities $(1-x)C$ and $xC$ respectively, and a control circuit connected to the independent terminals of the said auxiliary units.

According to another characteristic of the invention, the said auxiliary units are embodied in the form of two independent blocks housed in separated casings placed at one end of a battery.

According to still another characteristic and according to another embodiment, the said auxiliary units are gathered in one casing, their e.g. negative plates being connected to one terminal, whereas their positive plates are connected to two terminals in such a way that the said capacity ratio is obtained.

A further object of the invention, as new industrial products is the provision of storage batteries, more particularly nickel-cadmium or lead-acid batteries fitted with the above-mentioned device for ascertaining and contolling their discharge states.

Still another object of the present invention is the provision of a process and apparatus for charging and discharging a battery with pilot cells having the capacities mentioned.

Such a battery comprises, as compared to a standard type battery, the peculiarity of being composed of a number of standard cells to which is added at least one additional cell called a "pilot" cell, itself made of two-part cells, one called a "reserve" cell and the other a "normal use" cell, the latter part cell alone being used during the normal operation of the battery and the "reserve" cell being used when the "normal use" cell is discharged. The "reserve" cell and the "normal use" cell have their terminals of one polarity permanently electrically connected, the other terminals constituting free terminals. The free terminals are advantageously the positive terminals.

A value $x$ is selected corresponding to a predetermined discharge ratio, said discharge ratio being the one which must be detected. In practice, the "reserve" cell is preferably given a capacity substantially lower than that of the "normal use" cell.

During the normal operation of the battery, the discharge takes place only from the battery and the "normal use" cell which is series connected to the battery, so that a difference of voltage appears during discharge between the free terminals of the "reserve" cell and of the "normal use" cell, said difference varying at first slowly during the discharge but increasing substantially as the discharge of the "normal use" cell approaches its end.

It has already been shown that this difference of voltage may be used to detect the end of the discharge, and also to use it to alter the connections of the battery by means of a relay so that the discharge goes on with the "reserve" cell.

An essential further object of the present invention is a process for charging and discharging such a battery comprising at least one pilot cell in a case when the said battery is used as a buffer with alternate partial charges and discharges.

The process according to the invention more especially contemplates that during the periods of charge the "reserve" cell which alone is series connected with the rest of the battery is first charged, then the "normal use" cell also series connected with the rest of the battery is charged, and that during the periods of discharge the "normal use" cell is first discharged and then the "reserve" cell.

According to another characteristic of the invention, the "normal use" cell is, during charge, parallel-connected with the "reserve" cell as soon as the latter has reached a state of complete or nearly complete charge.

According to still another characteristic of the invention, in order to switch from the charging of the "reserve" cell to the charging of the "normal use" cell, use is made of the signal given by the difference of potential which appears between the free terminals of said two cells, during the charging of the "reserve" cell.

During the time of discharge, the "normal use" cell is first alone series connected with the rest of the battery, then, when the said cell is discharged, the "reserve" cell is parallely connected with it.

In order to switch from the discharge of the "normal use" cell to the discharge of the "reserve" cell, use is made of the signal provided by the difference of potential which appears between the free terminals of the said two cells, during the discharge of the "normal use" cell.

It may be seen that this process provides the possibility of charging the "reserve" cell first and of discharging the "normal use" cell first, so that the "reserve" cell may play its security role.

Yet another object of the invention is the provision of a device for applying said process, which is more especially noteworthy in that it essentially comprises selecting means for charge and discharge, intended for connecting, during the charge periods, the load circuit to the free terminal of the "reserve" cell and, during the discharge periods, the load circuit to the free terminal of the "normal use" cell, and a relay, said relay being connected to means for detecting the difference of potential between the free terminals of the aforesaid cells, said relay being such as to connect in parallel the "reserve" and "normal use" cells when said difference of potential reaches a predetermined value.

According to another characteristic of the invention, the said selecting means comprise an electromagnet, the main energizing winding of which is series connected to a load circuit, said selecting means being such that it controls two switches inserted in the leads connecting the said load circuit to the free terminals of the "reserve" and "normal use" cells.

Other characteristics and features of the invention will become apparent from the following detailed specification and the accompanying drawings forming a part hereof, wherein:

FIGURE 1 shows the principle of assembling a battery according to the invention;

FIGURE 1a shows a block diagram of the device of this invention in an operating circuit;

FIGURE 2 shows the said battery fitted with a device having a signal lamp;

FIGURE 3 shows the said battery fitted with a control or signal device having a relay;

FIGURE 4 shows the said battery fitted with a signal device with a blocking system;

FIGURE 5 shows the said battery fitted with a control or signal device with a relay and blocking system;

FIGURE 6 shows the said battery fitted with a control or signal device with amplification; and FIG. 6A an alternative circuit;

FIGURE 7 shows the discharge curve of the cell which has a capacity $(1-x)C$ compared to the cell which has a capacity of $xC$ and depicting the operating zones of the various signal devices above mentioned;

FIGURE 9 is a similar representation of another embodiment of a device according to the invention;

FIGURE 10 is a charge curve of a battery with a "pilot" cell fitted with a device according to the invention; and FIGURE 11 is a discharge curve of the said battery.

Figure 8:
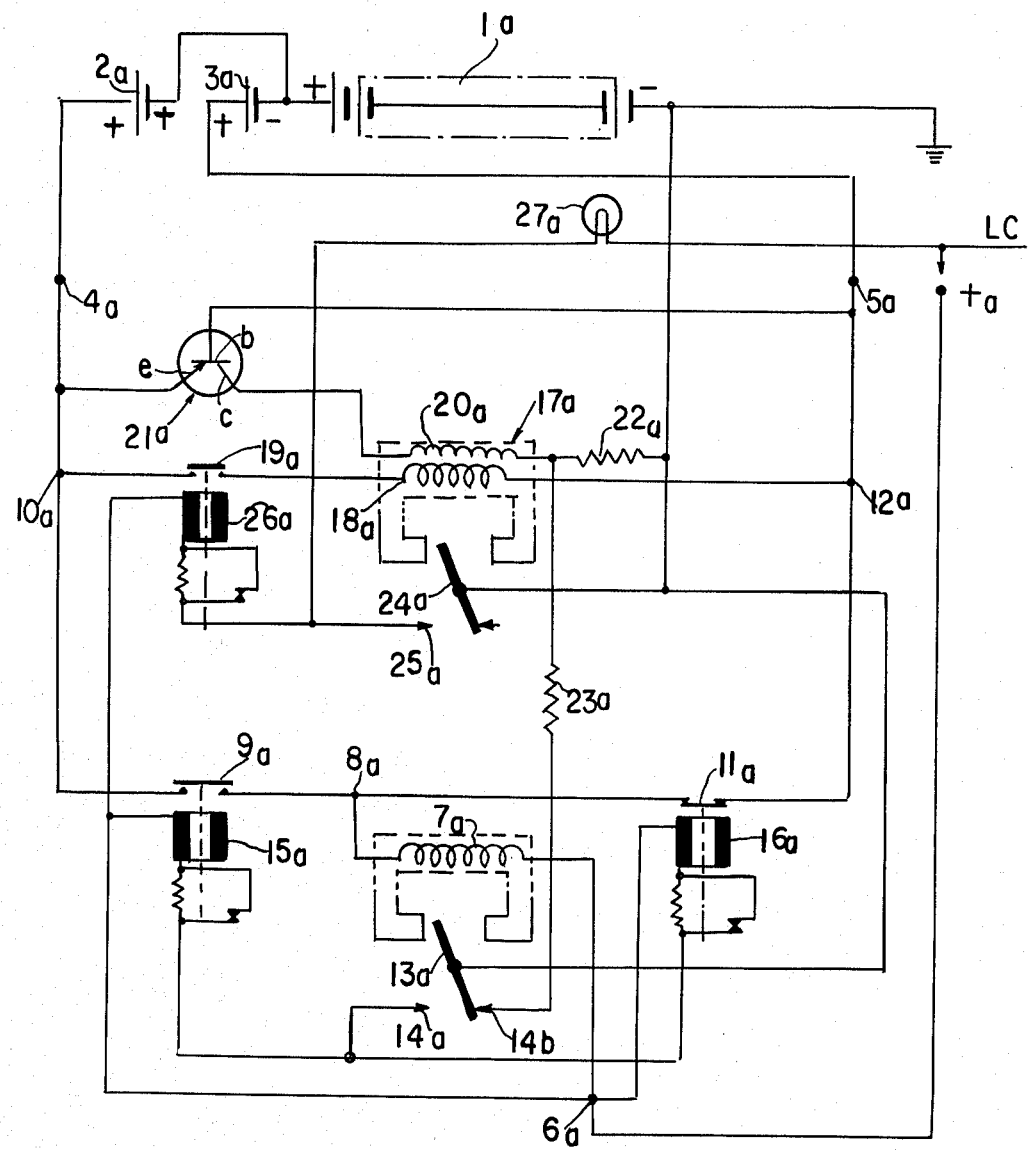
FIGURE 8 is a diagrammatic representation of a battery with a "pilot" cell according to the invention.

Referring now to the drawings, in FIGURE 1, the principle of a battery assembled according to the invention is shown, said battery providing for the warning of the nearness of the end of discharge. Said assembly consists in associating cells of various capacities. In the case of a battery where $n$ cells are associated, according to the example herein shown, the battery 1 comprises $n-2$ standard cells having a capacity C, series-connected, the $(n-1)$th cell 2 having a capacity $(1-x)C$, the $n$th cell 3 having a capacity $xC$, $x$ characterizing the ratio of discharge which is to be determined. In the drawing, the free terminal of the $(n-2)$ first cells (battery 1) bears the reference 4, the terminal common to cells 1, 2 and 3, the reference 5 and the free terminals of cells 2 and 3 respectively are designated 6 and 7.

The connections between battery 1 and cells 2 and 3 are effected in such a way that the battery 1 may be used by connecting together with the battery 1 either cells 2 or 3, or both. The battery and cell 2 may be used for instance by connection to the terminals 4 and 6, i.e. by using battery 1 ($n-2$ standard cells) and cell 2, cell 3 being kept as a reserve.

It is also possible to effect the connections in such a way that cells 2 and 3 are simultaneously used while being connected in parallel.

FIGURE 1a shows a block diagram of the general application of the device of the instant invention in a simple load and charging circuit. As shown, block 51 represents an operating battery having a plurality of cells with a capacity C. Blocks 52 and 53 represent respectively a "normal" cell and a reserve cell. Block 59 represents a signaling device, block 61 a load, and block 63 a charging source. Operating battery 51 has terminals 54 and 55. "Normal" cell 52 has one of its terminals connected to terminal 55 of battery 51 and a second terminal 56; likewise, reserve cell 53 has one of its terminals connected to terminal 55 and a second terminal 57. Signaling device 59 is connected between terminals 56 and 57, switch 60 being provided in parallel with device 59. A load circuit comprising load 61 and switch 62 is connected between terminals 54 and 56. In similar manner, a charging circuit comprising charge source 63 and switch 64 is connected between terminals 54 and 57.

The capacities of "normal" cell 52 and reserve cell 53 are chosen as follows:

When it is desired to have an indication when operating battery 51 has reached a certain state of discharge, reserve cell 53 is provided with a rated capacity equal to the remaining capacity of battery 51 at the point in its discharge cycle when it is desired to have such an indication and "normal" cell 52 is provided with a capacity that is the difference between the rated capacity of battery 51 and the rated capacity of reserve cell 53. Thus, the sum of the rated capacities of reserve cell 53 and "normal" cell 52 will be equal to the rated capacity of battery 51. The ratio of the capacity chosen for reserve cell 53 to the rated capacity of battery 51 is arbitrarily designated by the symbol $x$. This has been referred to as the ratio of discharge or the capacity ratio.

As a practical illustration, if operating battery is provided with a capacity of 75 ampere-hours and it is desired to have a warning signal when battery 51 has discharged during normal discharge cycle to a capacity of 15 ampere-hours, reserve cell 53 would be provided with a capacity of 15 ampere-hours and "normal" cell 52 would be provided with a capacity of 75 minus 15 ampere-hours or 60 ampere-hours.

In operation, the circuit of FIGURE 1a behaves as follows:

During a normal discharge cycle, switches 60 and 64 are open and switch 62 is closed, thus load 61 is placed across the terminals of battery 51 and "normal" cell 52, which are connected in series. Since signaling device 59 acts as on open circuit until a certain potential is impressed across it, reserve cell 53 does not operate during the normal discharge cycle. When battery 51 reaches that point in its discharge cycle such that its remaining capacity is equal to the rated capacity of reserve cell 53 and "normal" cell 52 has completely discharged, due to the sudden drop in voltage at terminal 56 by the complete discharge of cell 52, a voltage will be impressed across signaling device 59 such as to actuate it.

At this point, a number of actions may be taken:

(1) If it is desired that battery 51 continue to discharge into load 61, switch 60 may be manually or automatically closed so as to place reserve cell 53 into the load circuit.

(2) If, on the other hand, it is desired to recharge battery 51 at this point, switch 62 will be opened and switch 64 closed, thus placing charging source 63 in series with battery 51 and reserve cell 53. Since reserve cell 53 is completely charged, switch 60 will be closed so that "normal" cell 52 may be charged.

(3) If it is desired to charge cell 53, switch 60 would be kept open, thus causing charging source 63 to charge cell 53 first. After cell 53 has been charged, switch 60 will be closed and the charging of cell 52 will commence. It is to be understood that battery 51 is charging simultaneously with either cell 53 or cell 52.

The practical embodiment of such an assembling may be effected in several various manners. According to one, use may be made of a battery to which a special auxiliary cell is added, said auxiliary cell being constituted by two units which may, for instance, be in the form of independent blocks, said units being placed at one end of a battery, e.g. the positive end, and having their negative terminals commonly connected to the positive terminal 5 of said battery 1. As an example, a battery 1 has been constructed on this principle, said battery comprising nine series-connected cells having each a rated capacity of 75 amp.-hr. to which have been connected two auxiliary units constituted on the one hand by a 52 amp-hr. cell 2 and on the other hand by a 23 amp-hr. cell 3.

According to another embodiment, the auxiliary cells are gathered in the same casing as the standard cells, the e.g. negative plates of all cells are connected to one terminal, whereas the positive plates are apportioned between two terminals in such a way that the required ratio between the capacities is realized. It is obvious that the reverse way of connecting them may be used.

During the normal operation of the battery in discharge, only the part cell 2 used together with the battery 1 is discharged. Supposing that the battery 1 is completely charged at the start and that the part-cell 2 used has the capacity $(1-x)C$, it is obvious that the terminal voltage of said cell 2 will decrease. If this voltage is compared to the terminal voltage of cell 3 which is then in open circuit and completely charged, a simple way of determining a given state of discharge is obtained, while it is possible, by substituting or adding cells 3 to cell 2, to go on with the discharge of the battery, cell 3 providing the means for going on with the discharge after cell 2 has been discharged.

The complete discharge of cell 2 is only used for determining the critical discharge state. The difference between the positive potentials of cells 2 and 3 is the same as the difference between the voltages of cells 2 and 3 since their negative terminals at 5 are at the same potential. As a result, the variable available for characterizing a given discharge state is the potential difference between the electrically independent terminals 6 and 7 of cells 2 and 3. It is obvious that a wholly equivalent symmetrical disposition may be realized, the independent terminals being the negative terminals of cells 2 and 3.

The determination or the measure of this potential difference may be made by various ways.

For instance, as depicted in FIGURE 2, the independent terminals of cells 2 and 3 may be connected together through a control circuit 8 comprising a signalling lamp 9 which lights up when the difference of potential between the two terminals 6 and 7 is sufficient. According to this embodiment, a full lighting up of the lamp requires a difference of potential of about 1 volt.

Instead of directly placing the signalling lamp in the control circuit 8, it is also possible as shown in FIGURE 3, to put it in an auxiliary circuit 10, which is opened or closed by a relay 11, the energizing coil of said relay being placed in circuit 8. A power source 17 independent of the battery is provided in said circuit 10. The power supplying the lamp may also be tapped from the battery itself. A suitable operation of such a device may be obtained with a difference of potentials of 0.3 volt between the two terminals 6 and 7.

The drawback of both above described solutions is that it allows a permanent current to pass between the two cells 2 and 3. To avoid this drawback it is possible, as shown in FIGURE 4, to put in the control circuit 8 a blocking organ, such as a germanium diode or similar device 12 which only allows a current to pass in a given direction and above a value required for the bias of the diode. In such a disposition, the difference of potential between the independent terminals 6 and 7 of cells 2 and 3, required for putting the signalling device in action is increased by the voltage drop due to the threshold of the blocking organ 12, a drop which, for a conventional diode is of about 0.5 volt. A full lighting up of the lamp 9 with this disposition therefore requires a difference of potential of about 1.5 volts between terminals 6 and 7.

Such a blocking organ 12, may, of course, be used with a control device having a relay 11 as depicted in FIGURE 5. Said diode 12 is in this case series-connected to coil of the relay 11 in circuit 8 which opens and closes the auxiliary circuit 10. In this case, the difference of potential required between the two terminals 6 and 7 of cells 2 and 3 for operation of lamp 9 is about 0.8 volt.

It should be noted that the signalling through a relay as in FIGURES 3 and 5 gives a much clearer indication than that obtained by direct signalling as in FIGURES 2 and 4 wherein because the difference of potential progressively increases during operation, the light intensity of the lamp 9 also increases in a progressive way.

In the above-described signalling devices of FIGURES 3–5 and more especially in FIGURES 4–5 comprising use of a blocking organ 12, the signal voltage between terminals 6 and 7 of cells 2 and 3 has to reach a rather significant value before becoming usable, which in these cases is able to give a sufficient light intensity to the lamp 9. It is obvious that this requirement may be rather inconvenient if the discharge of the part-cell in use is not carried far enough.

In this case, the detection threshold may be reduced by providing an amplification of the current passing through the control circuit.

Such a control device is shown in FIGURE 6 and comprises an amplifier 13. The input of amplifier 13 in circuit 8 is connected to terminal 6. One of the amplifier output terminals is connected through a resistor 14 to terminal 7. The other output of amplifier 13 is connected to blocking organ 12 which, in turn, is connected to a lamp 9, said lamp 9 being connected on the other side by lead 19 to the terminal 4 of the battery 1.

As an alternative illustrated by FIGURE 6A the lamp 9 may be replaced by the operating coil of a relay 11' whose contacts when closed complete a circuit through lamp 9' and a separate power source 17'. Lamp 9 or lamp 9' according to the selected disposition will light when the difference of potential between terminals 6 and 7 of cells 2 and 3 reaches a signal value of approximately 200 mv.

The discharge curve of a cell 2 having a capacity $(1-x)C$ as compared to cell 3 having a capacity $xC$ is shown in FIGURE 7, the various operating ranges of the above described signalling devices being represented for comparison. The battery 1 equipped with these cells which gave this discharge, itself comprised $n-2$ cells each of a 75 amp-hr. capacity, one part cell 2 of 60 amp-hr. capacity and one part cell 3 of 15 amp-hr. Only cell 2 carries a discharge current whereas cell 3 only carries a very low current. The variation of voltages correspond to a discharge rate of 20 amps.

The ranges specified as $Z_1$, $Z_2$, $Z_3$, $Z_4$, $Z_5$ are as follows.

$Z_1$: direct signalling by lamp without blocking (FIG. 2).

$Z_2$: signalling or control by a relay without blocking (FIG. 3).

$Z_3$: direct signalling by lamp with blocking (FIG. 4).

$Z_4$: signalling or control through a relay with blocking (FIG. 5).

$Z_5$: signalling with amplification (FIG. 6).

It may be seen that the device with amplification (FIG. 6) comprises a voltage range $Z_5$ not far from the level part of the curve, and allows for a particularly accurate determination of the end of the discharge.

According to the embodiment shown in FIGURE 8, the battery 1a comprises $n-2$ series connected standard cells having a capacity C. A pilot cell is connected to these $n-2$ cells, said pilot cell being constituted by two cells, a cell 2a called a "reserve" cell having a capacity $xC$ and a cell 3a called a "normal use" cell having a capacity $(1-x)C$, $x$ being the discharge ratio which is to be determined. The value of $x$ may be chosen as 0.2, for instance, so that it is possible to know when the discharged capacity of the battery 1a reaches 80%. The "reserve" cell 2a has, therefore, 20% of the total capacity. Such a battery 1a may, for instance, comprise nine standard cells having a rated capacity of 75 amp-hr., to which is associated a pilot cell comprising the "reserve" cell 2a and the "normal use" cell 3a gathered in the same container. In the diagram, the reference number 4a represents the free terminal of the "reserve" cell and 5a the free terminal of the "normal use" cell, the said two cells preferably having their negative terminals commonly connected to the positive terminal of the battery 1a.

The charging current from a charging source $+a$ reaches a terminal 6a to which is connected a terminal of the winding of an electromagnetic polarized relay 7a which plays the part of selecting means for charge and discharge, the other terminal 8a of the winding of the electromagnet being connected on the one hand to the terminal 4a of the "reserve" cell 2a through a normally open relay switch 9a and a terminal 10a and on the other hand to the terminal 5a of "normal use" cell 3a through a normally closed relay switch 11a and a terminal 12a. An interlock member 13a of polarized relay 7a located in the magnetic field of the relay 7a, is movable into contact with either of the contact studs 14a, 14b. Stud 14a is connected to the coils 15a and 16a which operate the electromagnetic relay switches 9a and 11a respectively. Stud 14b is connected in another circuit as will be described. Said interlock 13a, according to its position, relative to stud 14a, opens one of said switches 9a and 11a while it closes the other.

A second polarized relay 17a is used to connect the "reserve" cell 2a and the "normal use" cell 3a in parallel. Said relay 17a comprises a main energizing winding 20a, one end of which is connected to the collector $c$ of a transistor 21a, the emitter $e$ and the base $b$ of which are connected to terminals 4a and 5a respectively. The other end of winding 20a is connected to ground on the one hand through a resistor 22a and on the other hand through a resistor 23a and contact stud 14b to movable interlock 13a of polarized relay 7a. These resistors 22a and 23a are used for regulating the value of the current in winding 20a. Polarized relay 17a is provided with an interlock 24a, which may make contact with a contact stud 25a thus closing the energizing circuit of the coil 26a of relay switch 19a or be moved away therefrom. The polarized relay 17a also comprises a secondary energizing winding 18a, one end of which is connected to the terminal 10a through the relay switch 19a and whose other end is connected to the terminal 12a. The said energizing winding 18a is used for maintaining interlock 24a, in contact with stud 25a while the switch 19a is closed.

A signalling lamp 27a is connected, on the one hand to the positive terminal $+a$ of a load circuit LC and on the other hand to ground through the contact stud 25a and the interlock 24a when the latter engages said stud.

The arrangement of FIGURE 8 operates in the following way:

*During the charge.*—The charging current flows from the $+a$ line via terminal 6a and energizes the coil of the electromagnet 7a, in such a direction that the interlock 13a moves from position 14b to position 14a, which causes the energization of coil 15a and coil 16a. The relay switch 9a closes while the relay switch 11a opens. The "reserve" cell 2a is, therefore, alone in charge through the switch 9a in the circuit 2a, 4a, 10a, 9a, 8a, 7a, 6a, $+a$ LC, ground, and 1a.

When the "reserve" cell 2a is charged, the unbalance between potentials at 4a and 5a is amplified by means of the transistor 21a which allows a current the value of which is regulated by resistor 22a, to flow through the winding 20a. The interlock 24a then moves into contact with the stud 25a and energizes the coil 26a which closes the switch 19a. One the other hand, the lamp 27a is illuminated, since its supplying circuit is now closed. At this moment, the interlock 24a would no longer be maintained in contact with the stud 25a by winding 20a, but it is by winding 18a. Said winding 18a functions to maintain the cells 2a and 3a in parallel connection during the second period of the charge during which the "reserve" cell 2a is in floating connection while the "normal use" cell 3a is charged in the usual way in the circuit 3a, 5a, 12a, 18a, 19a, 10a, 9a, 8a, 7a, 6a, $a+$, LC, ground, and 1a.

As to the end of the charge of cell 3a, it is desirous to provide for two possibilities. For that purpose, the winding 18a is given suitable dimensions.

(1) If the cells 2a and 3a are to be maintained in floating condition winding 18a must be given sufficient dimensions so that the interlock 24a stays connected to the stud 24a even for very low values of the residual charging currents near end of charge of cell 3a (between C/50 and C/20).

It must be noted that the number of ampere-turns of 18a should not be increased much above what is necessary, since during the periods of rest there is a risk of "reserve" cell 2a discharging into the "normal use" cell 3a through the switch 19a which is maintained in the closed position and through the winding 18a itself.

(2) A smaller size of winding 18a may be sufficient, so that for the residual currents the interlock 24a is no longer permanently connected to the stud 25a.

When the main winding 18a is no longer energized, the switch 19a opens. The residual currents, therefore, go on charging the "reserve" cell 2a and upon an increase of the difference of voltage with the "normal use" cell 3a transistor 21a again operates. The winding 20a is energized and the circuit of coil 26a is closed, thus closing the contact 19a and reestablishing the charge of the "normal use" cell 3a.

In this way, this cycle of operation may be repeated, thus forming a kind of beat around a mean equilibrium position.

When the charging current becomes null for a sufficiently long period of time, the interlocks 13a and 24a fall again into the position at which the switches 9a and 19a are open and for which the switch 11a is closed. The lamp 27 is extinguished. In this way, any connection between the cells 2a and 3a is cut out.

During discharge: the interlocks 13a and 24a, as well as the switches 9a, 19a and 11a being in the position shown in FIGURE 8, the current flows from the terminal 5a of the "normal use" cell 3a, through switch 11a through the winding of the electromagnet 7a and to the terminal 6a connected to the load circuit.

When the difference of the potentials of terminals 4a and 5a reaches a given value, the transistor 21a allows current flow through the circuit comprising the winding 20a, the resistor 22a, to ground. The current may also flow through the parallel circuit 21a, 20a, 23a, 14b and 13a. The winding 20a being energized, the interlock 24a moves into contact with the stud 25a, thus closing the switch 19a. The lamp 27a lights up, showing that it is the reserve cell 2a which supplies the load circuit. The current then flows from terminal 4a to the load circuit through the switch 19a, coil 18a, terminal 12a, switch 11a, coil 7a terminal 6a to the load circuit at $+a$ through the load circuit LC to ground and thence through battery 1a to cell 2a.

*Transition charge-discharge.*—When charging is over, the residual currents alone still maintain the interlocks 13a and 24a in contact with the studs 14a and 25a respectively. If the discharge begins after a very short time, the existence of the residual currents on the one hand and the inertia of the mechanical parts on the other hand, cause a delay in the operation of the polarized reverser relay 7a and the polarized relay 17a, for the current flows reversely through the winding 18 causing the return of the interlock 24a to its resting position away from contact 25 as i.e. for which no contact is established so that switch 19a opens. A current from the "reserve" cell 2a then flows reversely through the winding of the reverser relay 7a and the interlock 13a moves into contact with the stud 14b, so that the switch 9a opens, while the switch 11a closes and the discharge then takes place from the normal use cell 3a.

According to the example of FIGURE 8 which has been described, the same signalling lamp 27a is used either to show the parallel connecting of the cells 2a and 3a during the charge, or to mark the beginning of the use of "reserve" cell 2a during the discharge. It may be advantageous in some cases to provide two signalling lamps, which may be of different colors to distinguish between the two occurrences. This is shown in FIGURE 9.

According to the embodiment shown in FIGURE 9 all circuit components similar to those of FIGURE 8 bear the same reference characters. Lamp 27a is eliminated and the polarized electromagnetic relay 7a comprises also a second interlock 28a connected to the load circuit LC at $+a$ and intended to come into contact with one of the contact studs 29a or 29b connected to differently colored lamps 30a and 31a respectively. Said lamps are themselves connected to ground through the stud 25a and the interlock 24a. The lamp 30a lights up at the end of the charge of the "reserve" cell 2a and this effects the parallel connection of the "normal use" cell 3a; during discharge, the lamp 31a lights up when the "reserve" cell 2a is put in use.

In practice, this disposition may be realized by gathering the two parts 2a and 3a of the pilot cell into the same casing similar to the casing enclosing the standard cells of the battery 1a, as mentioned above. It may also be effected by placing the partial "reserve" and "normal use" cells 2a and 3a in two separate casings.

FIGURE 10 shows an example of the charging curves. These curves relate to a charge at 20 amps of a 75 amp-hr. battery comprising 10 cells that have been completely discharged. The curve A relates to the charge of the "reserve" cell 2a, the curve B relates to the charge of the "normal use" cell 3a, the curve C relates to the total charge of the battery. The sections P and P′ of curves A and B which are substantially parallel to the voltage axis show the operation of the device parallel-connecting the "reserve" cell 2a and the "normal use" cell 3a. It must be noted that the curve of total battery charge C drops at this moment by about 0.2 volt, then goes up again and continues the initial curve.

FIGURE 11 shows an example of discharge curves. These curves relate to a 20 amps' discharge of a 75 amp-hr. battery comprising 10 cells charged, with a peak of 5 seconds at 300 amps after the operation of the device series-connecting the reserve cell and the normal use cell, i.e. after the moment when the reserve cell begins discharging. The curve Aa relates to the discharge of the "reserve" cell 2a, the curve Ba relates to the discharge of the "normal use" cell 3a and the curve Ca to the discharge of the total battery. It may be seen that the curve Aa at the beginning has a constant voltage since the "reserve" cell 2a does not discharge while the "normal use" cell 3a (curve Ba) discharges in the usual way. When discharge of the latter approaches its end (1.10 volts), the device for parallel-connecting the part cells 2a and 3a operates so that the voltage of the "reserve" cell 2a (curve A) drops to 1.25 volts, to which the voltage of the "normal use" cell 3a rises, so that the total voltage slightly increases through the introduction in the battery of the "reserve" cell 2a. If, at this moment, a rapid discharge is needed (e.g. discharge at 300 amps), the corresponding discharges of the battery and of the two part cells are shown at the right of said figure.

It is, of course, possible to effect numerous modifications to the embodiments shown without departure from the invention. Thus, for instance, other devices than those described could be used for the reversing charge-discharge and for the parallel connecting of the two cells 2a and 3a of the pilot cell. Instead of a transistor 21a a triode valve could be used or an amplifier means of another type. In the same way, the signalling lamps shown could be replaced by any other means giving an optical, acoustic or other signal or by using a detecting organ connected to a feed-back device instead of giving a visible or audible signal. Several pilot cells could be provided, each corresponding to a given state of discharge.

While specific embodiments of the invention have been described and shown, variations within the scope of the appended claims are possible and are contemplated. There is no intention, therefore, of limitation to the exact disclosure herein made.

What is claimed is:

1. A circuit arrangement for determining the discharge state of a battery comprising a battery having a determined number of cells of like capacity connected in series, a pair of cells of differing lesser capacity than the cells of the battery having like poles thereof connected in common to one of the poles of the battery and means connected across the other poles of said two cells and responsive to a prescribed difference in voltage therebetween when the battery is in operation with at least one of said two cells in series therewith to provide a measure of the discharge state of said battery.

2. The circuit arrangement of claim 1 wherein said means includes a signalling device.

3. The circuit arrangement of claim 2 wherein said signalling device is a lamp.

4. A circuit arrangement for determining the discharge state of a battery comprising a battery having $n_1$ cells of like capacity C connected in series, a pair of cells of differing lesser capacity one having a capacity $(1-x)C$ and the other a capacity $xC$ wherein $x$ is any selected fractional value between 0 and 1, said two cells having like poles thereof connected in common and to one of the poles of said battery, and means connected across the other two poles of said two cells and responsive when the battery is in operation in series with at least one of said two cells to a prescribed difference in voltage between said two other poles to provide a measure of the discharge state of said battery.

5. The circuit arrangement of claim 4 wherein said means includes a signalling device.

6. The circuit arrangement of claim 5 wherein said signalling device is a lamp.

7. A circuit arrangement for determining the discharge state of a battery comprising a battery having $n_1$ cells of like capacity C connected in series, a pair of cells, one having a capacity $(1-x)C$ and the other a capacity $xC$ where $x$ is any selected fractional value between 0 and 1, said pair of cells having like poles thereof connected in common and to a pole of opposite polarity of said battery, a circuit including a relay having closable contacts connected across the two other poles of said pair of cells and responsive when the battery is in operation in series with at least one of said pair of cells to a prescribed difference in voltage between said two other poles to close said closable contacts and a second circuit including said closable contacts and a signalling device that is operated when said closable contacts are closed to provide a measure of the discharge state of said battery.

8. The circuit arrangement of claim 7 wherein said first-named circuit includes a blocking organ which permits passage of current therethrough in one direction only.

9. The circuit arrangement of claim 8 wherein said blocking organ is a diode.

10. The circuit arrangement of claim 7 wherein said second-named circuit includes a separate power source to energize said signalling device when said closable contacts are closed.

11. The circuit arrangement of claim 10 wherein said signalling device is a lamp.

12. A circuit arrangement for determining the discharge state of a battery comprising a battery having $n_1$ cells of like capacity C connected in series, a pair of cells one having a capacity $(1-x)C$ and the other a capacity $xC$, where $x$ is any selected fractional value between 0 and 1, said pair of cells having like poles thereof connected in common and to a pole of opposite polarity of said battery, a first circuit including an amplifier connected to the two other poles of said pair of cells and responsive when the battery is in operation in series with at least one of said pair of cells to a prescribed difference in voltage between said two other poles to provide a corresponding amplified output of said amplifier, and a second circuit connected to receive the output of said amplifier and including therein, a switching device, and a signalling device denoting a state of charge of said battery and a third circuit connectable by said switching device in said second circuit when the latter is energized in the reverse direction by the output of said amplifier to provide a signal denoting a discharge state of said battery.

13. The circuit arrangement of claim 12 wherein said switching device includes a relay which is energized by said amplifier output and has a pair of closable contacts in said third circuit that close upon such energization and which are connected to said signalling device and to a power source so as to operate said signalling device only when said closable contacts are closed.

14. A circuit arrangement for a battery comprising a battery having a determined number of cells of like capacity connected in series, a pair of cells of differing lesser capacity, one being a reserve cell and the other a normal use cell and having like poles thereof connected in common to one of the poles of the battery, means for series-connecting the reserve cell to the battery during charging and then the normal use cell, means during discharge of the battery for first discharging the normal use cell and then the reserve cell, and switching means responsive to the difference in potential between the other two poles of said pair of cells to so effect said charging and discharging of said reserve and normal use cells.

15. A circuit arrangement for charging and discharging a battery having pilot cells comprising a battery of $n_1$ cells of like capacity connected in series, a normal use cell and a reserve cell each of lower different capacity than the cells of the battery, like poles of said normal use cell and said reserve cell being connected to a pole of opposite polarity of said battery, the other two poles of said normal use cell and said reserve cell being connected to separate terminals between which a difference of potential may exist, a load circuit, selecting means sensitive to direction of current flow therethrough for connecting the load circuit to said other pole of the reserve cell during periods of charge and for connecting said other pole of said normal use cell to the load circuit during periods of discharge, means for detecting a difference of potential between said other poles of said normal use cell and said reserve cell and a relay connected to said detecting means to connect said reserve cell and said normal use cell in parallel when said difference of potential achieves a selected value.

16. The circuit arrangement of claim 15 wherein said selecting means comprises a polarity relay device including an energizing winding which is in series-connection with said load circuit and a pair of switches connected respectively to said other poles of said normal use cell and said reserve cell so that when one is opened the other one is closed.

17. The circuit arrangement of claim 15 including an amplifier circuit and wherein said relay comprising an electromagnet having an energizing coil connected to one terminal of said amplifier circuit, which latter is also connected to the said other poles of said normal use and reserve cells so that a current flows through said coil when said difference of potential achieves a given value and a switch that is closed by such energization of said coil.

18. The circuit arrangement of claim 17 including a second energizing coil connectable through said switch to said other pole of said reserve cell and also connected to said other pole of said normal use cell, to maintain a parallel connection between said normal use cell and said reserve cell at prescribed times.

19. The circuit arrangement of claim 17 wherein said amplifier circuit includes a transistor having a base, an emitter and a collector, said emitter and said base being connected respectively to said other poles of said reserve cell and of said normal use cell, said energizing coil being connected to said collector.

20. The circuit arrangement of claim 15 including signalling means connected to said load circuit through a second relay, said signalling means serving to indicate the connection of the reserve cell in periods of discharge and also of the end of its charge period.

21. The circuit arrangement of claim 20 wherein said signalling means is visual.

22. The circuit of claim 20 wherein said signalling means is aural.

23. The circuit arrangement of claim 15 including a pair of signalling means respectively indicating the pulling into discharge condition of the reserve cell and the putting into charge condition of said cell.

24. The circuit arrangement of claim 15 wherein said $n_1$ cells each have a capacity C, said normal use cell has a capacity $(1-x)C$ and said reserve cell has a capacity $xC$, where $x$ is any selected fraction from 0 to 1.

No references cited.

JOHN F. COUCH, *Primary Examiner.*

LLOYD McCOLLUM, MILTON O. HIRSHFIELD,
*Examiners.*

G. H. GERSTMAN, S. WEINBERG,
*Assistant Examiners.*